(12) United States Patent
Moore et al.

(10) Patent No.: US 9,696,914 B2
(45) Date of Patent: Jul. 4, 2017

(54) SYSTEM AND METHOD FOR TRANSPOSED STORAGE IN RAID ARRAYS

(71) Applicant: NetApp, Inc., Sunnyvale, CA (US)

(72) Inventors: Joseph Moore, Sunnyvale, CA (US); Donald Humlicek, Sunnyvale, CA (US); Jeffrey A. Stilger, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/388,505

(22) Filed: Dec. 22, 2016

(65) Prior Publication Data
US 2017/0102887 A1    Apr. 13, 2017

Related U.S. Application Data

(63) Continuation of application No. 14/188,347, filed on Feb. 24, 2014, now Pat. No. 9,547,448.

(51) Int. Cl.
*G06F 3/06* (2006.01)
*G06F 12/0802* (2016.01)

(52) U.S. Cl.
CPC ............ *G06F 3/0611* (2013.01); *G06F 3/064* (2013.01); *G06F 3/0619* (2013.01); *G06F 3/0647* (2013.01); *G06F 3/0659* (2013.01); *G06F 3/0665* (2013.01); *G06F 3/0685* (2013.01); *G06F 3/0689* (2013.01); *G06F 12/0802* (2013.01); *G06F 2212/1024* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 5,440,716 A | 8/1995 | Schultz et al. | |
| 5,592,648 A | 1/1997 | Schultz et al. | |
| 5,909,691 A | 6/1999 | Schultz et al. | |
| 6,148,414 A | 11/2000 | Brown et al. | |

(Continued)

OTHER PUBLICATIONS

Shafer et al., "The Hadoop Distributed Filesystem: Balancing Portability and Performance," Rice University, Houston, TX, Performance Analysis of Systems & Software (ISPASS), 2010 IEEE International Symposium on, Mar. 28-30, 2010, pp. 122-133.

(Continued)

*Primary Examiner* — Christopher D Birkhimer
(74) *Attorney, Agent, or Firm* — Haynes and Boone, LLP

(57) ABSTRACT

A system and method of transposed storage in RAID arrays includes a storage manager with an interface for receiving storage requests associated with multi-segment blocks stored in a storage array, a controller for processing the received storage requests and controlling the storage manager, and a write request handler. The storage array includes a plurality of storage devices for which consecutive logical addresses are assigned to different ones of the storage devices. The write request handler is configured to process block write requests and send segment write requests to the storage array based on the write requests so that each segment of a given multi-segment block is written to a single respective one of the storage devices in the storage array. In some embodiments, the storage manager further includes a read request handler configured to determine logical addresses of requested segments and send segment read requests to the storage array.

20 Claims, 5 Drawing Sheets

(56) References Cited

U.S. PATENT DOCUMENTS

| | | |
|---|---|---|
| 6,609,176 B1 | 8/2003 | Mizuno |
| 6,912,668 B1 | 6/2005 | Brown et al. |
| 6,922,752 B2 | 7/2005 | Uysal et al. |
| 7,039,730 B2 | 5/2006 | Hirako |
| 7,228,381 B2 | 6/2007 | Uysal et al. |
| 7,246,260 B2 | 7/2007 | Brown et al. |
| 7,315,922 B2 | 1/2008 | Otsuka et al. |
| 7,353,336 B2 | 4/2008 | Gaither et al. |
| 8,095,577 B1 | 1/2012 | Faibish et al. |
| 8,127,076 B2 | 2/2012 | Galloway et al. |
| 8,255,625 B2 | 8/2012 | Galloway et al. |
| 8,521,955 B2 | 8/2013 | Arulambalam et al. |
| 2002/0091903 A1 | 7/2002 | Mizuno |
| 2002/0194427 A1 | 12/2002 | Hashemi |
| 2004/0037120 A1 | 2/2004 | Uysal et al. |
| 2004/0039869 A1 | 2/2004 | Kurokawa et al. |
| 2005/0086559 A1 | 4/2005 | Uysal et al. |
| 2005/0120169 A1 | 6/2005 | Hirako |
| 2006/0005076 A1 | 1/2006 | Brown et al. |
| 2006/0077724 A1 | 4/2006 | Chikusa et al. |
| 2006/0112220 A1 | 5/2006 | Otsuka et al. |
| 2006/0143506 A1 | 6/2006 | Whitt et al. |
| 2006/0206661 A1 | 9/2006 | Gaither et al. |
| 2008/0168209 A1 | 7/2008 | Davison |
| 2010/0211737 A1 | 8/2010 | Flynn et al. |
| 2011/0046969 A1 | 2/2011 | Carlson et al. |
| 2011/0047040 A1 | 2/2011 | Carlson et al. |
| 2011/0202723 A1 | 8/2011 | Yochai et al. |
| 2011/0252197 A1 | 10/2011 | Watanabe et al. |
| 2011/0295968 A1 | 12/2011 | Takaoka et al. |
| 2012/0054433 A1 | 3/2012 | Galloway et al. |
| 2012/0131275 A1 | 5/2012 | Huang et al. |
| 2012/0192037 A1 | 7/2012 | Gibson et al. |
| 2013/0046930 A1 | 2/2013 | Eleftheriou et al. |
| 2013/0046931 A1 | 2/2013 | Eleftheriou et al. |
| 2013/0091237 A1 | 4/2013 | Arulambalam et al. |
| 2013/0103895 A1 | 4/2013 | Iwamura et al. |
| 2013/0246342 A1 | 9/2013 | Faith et al. |
| 2013/0262390 A1 | 10/2013 | Kumarasamy et al. |
| 2013/0262750 A1 | 10/2013 | Yamasaki et al. |
| 2013/0262761 A1 | 10/2013 | Oh |
| 2013/0290777 A1 | 10/2013 | Yoshihara |
| 2013/0326534 A1 | 12/2013 | Gupta et al. |
| 2013/0326538 A1 | 12/2013 | Gupta et al. |
| 2014/0006727 A1 | 1/2014 | Abe et al. |
| 2014/0040575 A1 | 2/2014 | Horn |

OTHER PUBLICATIONS

Webopedia, "Hadoop Distributed File System—HDFS", Dec. 2, 2012, pp. 1-2, https://web.archive.org/web/20121202231205/http://www.webopedia.com/TERM/H/hadoop_distributed_file_system_hdfs.html.

Webopedia, "Hadoop," Jun. 4, 2011, pp. 1-2, https://web.archive.org/web/20110604221812/http://www.webopedia.com/TERM/H/hadoop.html.

Webopedia, "Metadata," Apr. 5, 2001, pp. 1-2, https://web.archive.org/web/20010405235507/http://www.webopedia.com/TERM/M/metadata.html.

Webopedia, "Native Command Queuing," Nov. 22, 2004, pp. 1-2, https://web.archive.org/web/20041122022740/http://www.webopedia.com/TERM/N/Native_Command_Queuing.html.

|  | 0 | 1 | 2 | ... | 7 | 8 | 9 | Drive/Column |
|---|---|---|---|---|---|---|---|---|
| 0 | 0 | 1 | 2 | ... | 7 | P | Q | |
| 1 | 9 | 10 | 11 | ... | P | Q | 8 | |
| 2 | 18 | 19 | 20 | ... | Q | 16 | 17 | |
| ⋮ | ⋮ | ⋮ | ⋮ | ⋮ | ⋮ | ⋮ | ⋮ | |
| 7 | 63 | P | Q | ... | 60 | 61 | 62 | |
| 8 | P | Q | 64 | ... | 69 | 70 | 71 | |
| 9 | Q | 72 | 73 | ... | 78 | 79 | P | |
| 10 | 80 | 81 | 82 | ... | 87 | P | Q | |
| 11 | 89 | 90 | 91 | ... | P | Q | 88 | |
| ⋮ | ⋮ | ⋮ | ⋮ | ⋮ | ⋮ | ⋮ | ⋮ | |

Row/Stripe

```
Addr[0] = Base;                          // Start at base LBA
Next = Base;
For I = 1 to (Size – 1)                  // Loop through each segment
   If ((Next mod (D - 2)) == (D - 3))    // Test to see if P & Q are to be skipped
      Next += 2*D – 3;                   // Skip P & Q
   Else
      Next += D – 1;                     // No need to skip P & Q
   EndIf
   Addr[I] = Next;                       // Store LBA
EndFor
```

420

```
Full = Offset div (D - 2);                       // Number of full P & Q rotation patterns
Partial = Offset mod (D - 2);                    // Number of steps into last rotation
Addr = Base + Full*D*(D - 2);                    // Offset for each full rotation
Start = Base mod (D - 2);                        // Location of base within a rotation
If ((Start + Partial) >= (D - 2))                // Test if P & Q position to left or right
   Addr += 2*D - 3 + (Partial - 1)*(D - 1);      // Skip over P & Q
Else
   Addr += Partial*(D - 1);                      // No P & Q skip over
EndIf
```

430

```
Row = Base div (D - 2);            // Find absolute row
Partial = Base mod (D - 2);        // Find partial position in row
StartCol = D – (Row mod D);        // Find row within rotation
Col = (StartCol + Partial) mod D;  // Find column
```

440

```
If (Col <= (Row mod D))            // Determine if left of P & Q
   Base = Row*(D - 1) + Col;       // Adjust address up
Else
   Base = Row*(D - 1) – (D – Col); // Adjust address down
EndIf
```

FIG. 4

SYSTEM AND METHOD FOR TRANSPOSED STORAGE IN RAID ARRAYS

RELATED APPLICATIONS

The present application is a continuation of U.S. patent application Ser. No. 14/188,347 filed on Feb. 24, 2014, the entirety of which is herein incorporated by reference.

TECHNICAL FIELD

The present disclosure relates generally to computing systems, and more particularly to transposed storage in RAID arrays.

BACKGROUND

Modern storage systems are being increasingly called upon to store and manage ever increasing amounts of data. As the amount of data increases, more and more big data applications are being developed that would like to concurrently access significant amounts of this data for analysis and processing. This puts an ever increasing burden on the storage system to not only be able to store the data, but to provide access to larger and larger amounts of the data with minimum amounts of delay. The storage system is also expected to provide backup and redundancy so that failures in portions of the storage system do not result in the loss of data. The storage system may also provide high availability to the data so that periods of high demand do not unduly impact the responsiveness of the storage system.

As more and more big data applications are developed, ever improving big data storage systems are desired. Accordingly, it would be desirable to provide improved storage systems capable of supporting big data and big data applications.

BRIEF DESCRIPTION OF THE DRAWINGS

FIG. 2 is a simplified diagram of example logical address assignment in a RAID array according to some embodiments.

FIG. 4 is a simplified diagram of example algorithms used to determine logical addresses of segments according to some embodiments.

Figure 1:
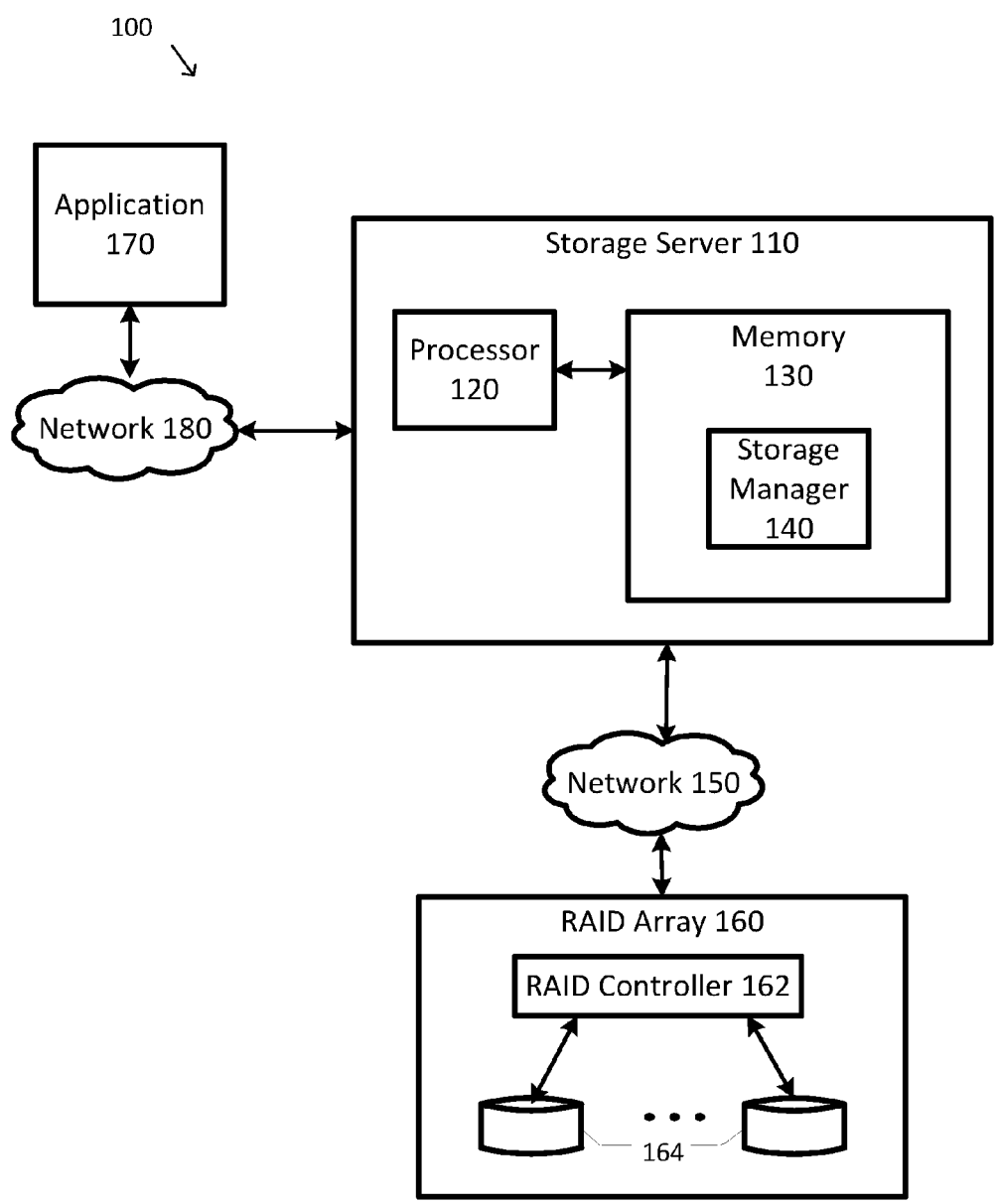
FIG. 1 is a simplified diagram of another example computing system according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various storage systems and storage paradigms have been developed to address one or more aspects of big data. For example, the Hadoop Distributed File System (HDFS), which is used in many big data applications, uses a distributed storage approach. HDFS is designed around an array of distributed processors that provide access to large amounts of data in distributed storage devices, which are typically individual disk drives or their equivalents. To provide for backup, redundancy, and high availability, HDFS stores replica copies of each block of data in multiple storage devices so that failures in one of the storage devices does not result in data loss, with the multiple copies also supporting high availability. This arrangement, however, typically multiplies the amount of storage used by HDFS by a factor equal to the number of replica copies of each block, and may greatly reduce the storage efficiency of HDFS.

HDFS also includes support for big data processing using the Hadoop framework, which includes map-reduce capabilities for partitioning processing or mapping of the data and then reducing the mapped data into results that may be aggregated. The map-reduce capabilities of the Hadoop framework provide good support for searching, sorting, and similar big data activities. To operate effectively, the Hadoop framework leverages the distributed storage and processing model of HDFS during the map-reduce operations that typically involve parallel access to and analysis of several large blocks of data.

Other storage device arrangements have been used outside of HDFS with varying amounts of success with big data. One such arrangement is a redundant array of independent disks (RAID array). In a RAID array, a series of independent disk drives or other storage devices are operated in parallel. As data is received for storage it is divided into segments, and the segments are typically stored across multiple storage devices using a technique called striping. By dividing each block of data into segments and storing the segments in stripes across the separate storage devices, RAID arrays often provide good support for high availability as multiple storage devices may work in parallel to satisfy a read request or a series of read requests.

RAID arrays also store segments that contain redundancy information that varies depending on the version of RAID being implemented in the RAID array. In some versions of RAID, the redundancy information includes duplicates of the segments and in other versions the redundancy information includes parity segments or other forms of error detection and/or correction. This redundancy information also provides a good compromise between backup and redundancy goals and total storage used, with the total amount of storage used being at most twice as large as the amount of data stored.

RAID arrays using striping, however, are not always the best choice for the storage devices in HDFS or other file systems that use large data blocks. For example, the block sizes used by HDFS are typically much larger than the segment sizes used by RAID arrays, typically as much as a thousand times larger. This means that the striping that supports high availability in the RAID array becomes somewhat of a detriment when used with large block file systems such as HDFS. This is because the data for just a single large block may be stored on 100 or more stripes in a RAID array. This means that the segments of two different large blocks, and the stripes they are stored in, are often a long distance away from each other on the storage devices in the RAID array. Thus, for a file system to concurrently access multiple large blocks in parallel, a common occurrence with map-reduce operations, the storage device often has to cycle back and forth or thrash great distances across each storage device. This often greatly reduces the responsiveness of the RAID array during storage read requests.

Much of this thrashing may be eliminated by carefully controlling how large multi-segment blocks are stored in the storage devices of the RAID array. Rather than writing each large multi-segment block in stripes on the RAID array, several large multi-segment blocks are stored at the same time with consecutive segments being taken from different large multi-segment blocks. Thus, rather than each large multi-segment block being striped across the storage devices in consecutive locations from the perspective of the RAID array, the segments in each large multi-segment block are transposed so that they may be stored in consecutive locations in a single storage device. In this way, each storage device in a stripe stores a segment from a different large multi-segment block. Thus, when a large multi-segment block is read back from the RAID array, each of the segments containing the multi-segment block is sequentially located on just a single storage device. This supports read operations where little or no thrashing occurs as long as each storage device is responding to block read requests for just one large multi-segment block at a time. This may be accomplished by separating read requests for large multi-segment blocks into separate queues corresponding to each of the storage devices in the RAID array.

Transposing the storage of the segments of large multi-segment blocks in a RAID array involves careful control of the locations or addresses where the segments are stored. From the perspective of the RAID array, logical addresses are organized consecutively with the first logical address being assigned to the first segment location in the first storage device with consecutive logical addresses being assigned across the stripes, with the address for the second logical segment being in the second storage device, and so forth until the end of the stripe is reached. At this point, the logical addresses are then assigned beginning with the second segment on the first drive, then the second segment of the second drive, and so forth. This is further complicated by segments containing the redundancy information, which are skipped over during the assignment of the logical addresses. However, by transposing the storage of large multi-segment blocks onto a single storage device, consecutive segments from the large multi-segment block are no longer found at consecutive logical addresses in the RAID array. This requires careful mapping of storage requests specifying a large multi-segment block and segments within the large multi-segment block to the logical addresses where the segments are located within the RAID array, so that the large multi-segment blocks may be retrieved later.

FIG. 1 is a simplified diagram of another example computing system 100 according to some embodiments. As shown in FIG. 1, computing system 100 is built around a storage server 110 and a RAID array 160. Storage server 110 includes a processor 120 coupled to memory 130. Operation of storage server 110 is controlled by processor 120. And although storage server 110 is shown with only one processor 120, it is understood that processor 120 may be representative of one or more central processing units, multi-core processors, microprocessors, microcontrollers, digital signal processors, field programmable gate arrays (FPGAs), application specific integrated circuits (ASICs), and/or the like in storage server 110. Storage server 110 may be implemented as a stand-alone subsystem and/or board added to a computing device or as a virtual machine.

Memory 130 may be used to store software executed by the storage server 110, one or more data structures used during operation of storage server 110, as well as data being cached by storage server 110. Memory 130 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Storage server 110 is further coupled to persistent storage in the form of RAID array 160 through a network 150. Network 150 may be any kind of network including one or more connectors or cables, such as small computer serial interface (SCSI) cables, local area networks (LANs), such as Ethernets, and/or wide area networks like the internet. Storage manager 140 may communicate with a RAID controller 162 in RAID array 160 using any suitable storage protocol, such as the SCSI protocol, the Internet SCSI (iSCSI) protocol, and/or the like. RAID controller 162 may receive storage requests from storage manager 140 and forward them to one or more storage devices 164 included in RAID array 160. Each of the storage requests typically includes one or more logical addresses or logical block addresses (LBAs) that identify corresponding segments of data stored in storage devices 164. Each of the segments may be located in different storage devices 164 and at different locations within the storage devices 164 as is discussed in greater detail with respect to FIG. 2. The storage efficiency and utilization of a RAID array, such as RAID array 160, is generally better than the storage efficiency and utilization of HDFS and its system of replicating blocks. This allows a RAID array with storage devices having the same capacity as corresponding storage devices in a HDFS to store more data. Depending upon the version of RAID used, the storage efficiency and utilization is 50 percent or greater, whereas a HDFS with a commonly used replication factor of 3 has a storage efficiency and utilization of only 33 percent.

Each of the storage devices 164 may include persistent storage. Some common forms of persistent storage include, for example, floppy disk, flexible disk, hard disk, magnetic tape, any other magnetic medium, CD-ROM, DVD-ROM, any other optical medium, battery-backed RAM, PROM, EPROM, FLASH-EPROM, any other memory chip or cartridge, and/or any other medium from which a processor or computer is adapted to read from and write data to.

Storage server 110 and storage manager 140 typically facilitate access to the data stored in RAID array 160 to one or more applications, such as representative application 170. Application 170 may be coupled to storage server 110 using a network 180. Network 180 may include one or more LANs and/or WANs. In some embodiments, network 180 may be the same as network 150 and/or partially overlap network 150. In some embodiments, application 170 may be running on any computing device, including storage server 110. Application 170 may access the services of storage manager 140 by using an interface of storage manager 140 for supporting application programming interface (API) calls, remote procedure calls, web services, and/or like that may be used to make one or more storage requests. Each of the storage requests may include sufficient information for storage manager 140 to determine the logical addresses used by RAID controller 162 to store the requested data. In some embodiments, application 170 may use a map-reduce interface, such as the Hadoop API of the Hadoop framework. The map-reduce interface may receive processing requests from application 170, to support searching, sorting, and/or analyzing of the large amounts of data RAID array 160 and may further access the interface of storage manager 140.

FIG. 2 is a simplified diagram of example logical address assignment in a RAID array 200 according to some embodiments. FIG. 2 is generally consistent with a 10-drive/storage device RAID array 200 using the RAID 6 convention. Each box in FIG. 2 represents a segment of storage within the RAID array 200. In RAID 6, data is stored on the storage devices in the array using stripes and dual parity information. Storage in the RAID array 200 may be described in terms of the rows and columns where the data is stored. Each column in the RAID array 200 represents a drive or storage device. In the examples of FIG. 2, the RAID array 200 has ten storage devices, so there are 10 columns labeled from 0 to 9. In some examples, each of the columns/storage devices may correspond to the storage devices 164 from FIG. 1.

Each row represents a stripe of data in the RAID array 200. In RAID 6, two segments in each stripe are used for the dual parity information as represented by the P and Q segments. When data is written in consecutive order to a RAID 6 array, the last two segments written include the P and Q parity segments. To evenly distribute the P and Q segments across each of the storage devices, the P and Q segments are rotated through each of the storage devices. Segments in each of the stripes are generally assigned consecutive logical addresses in ascending order from left to right in a circular fashion, with the complication that the position of the P and Q segments dictates which of the storage devices in each stripe receives the first segment in the stripe. The assignment of logical addresses, further omits assigning logical addresses to the P and Q segments.

In the 10-storage device RAID 6 array 200, each stripe includes 8=10−2 segments with user data, which is assigned a logical address along with two segments for P and Q. In the first stripe (row or stripe 0), the first eight storage devices (storage devices 0 through 7) are assigned logical addresses 0 through 7, respectively. Storage devices 8 and 9 are then used for the P and Q, respectively, for that row/stripe. Once the first stripe is assigned logical addresses 0 through 7, the assignment process continues for the second stripe (row or stripe 1), but with P and Q rotated one column/storage device to the left, so that the next logical address (8) is assigned to the segment in column/storage device 9 with logical addresses 9 through 15 being assigned to column/storage devices 0 through 6, respectively. The assignment of logical addresses continues in similar fashion for rows/stripes 2 through 9 until P and Q are rotated around back to the last two columns/storage devices. The pattern of logical address assignment then repeats for rows/stripes 10 through 19, and so on. Thus, for a RAID 6 array with D storage devices, D*(D−2) segments (80=10*(10−2) in the examples of FIG. 2) are assigned logical addresses in each rotation of D rows/stripes (10 in the examples of FIG. 2).

The assignment of logical addresses for each segment in the RAID array 200 follows a logical pattern. The logical addresses are assigned in circular left to right order across each row/stripe subject to the locations of the P and Q segments in the row/stripe. The pattern of logical addresses also advances regularly in each column/storage device. For (D−3) of the rows/stripes the logical addresses increase by (D−1) between rows. And when the P and Q segments are rotated through the column/storage device, two rows/stripes are skipped and the logical addresses increase by (2*D−3) (17=2*10−3 in the examples of FIG. 2) over the last 3 rows/stripes.

The scope of embodiments for RAID arrays is not limited to the structure and arrangement shown in FIG. 2. According to some embodiments, different RAID versions may be used in the RAID array 200. In some examples, other than 10 columns/drives/storage devices may be used in the RAID array 200. In some examples, different numbers than the two parity segments may be used in each row/stripe, including zero, one, and/or three or more parity segments. In some embodiments, logical addresses may be assigned with a different granularity. The granularity of logical addresses is based on segments, so that at most a single logical address is assigned for each column/storage device in each row/stripe. In some embodiments, the logical addresses may be scaled to account for smaller storage units. In some examples, the logical addresses may be assigned to individual blocks and/or to other storage units that form each segment. In some examples, each segment may be used to store 64 kilobytes of data. When logical addresses are assigned at the byte level, each of the segments includes 65,536 logical addresses with the first segment (segment 0) including logical addresses 0 through 65,535, the second segment (segment 1) including logical addresses 65,536 through 131,071, and so forth. The segment numbers in FIG. 2 may be used to identify the starting logical address in each segment by multiplying the segment number by the number of logical addresses in each segment. When logical addresses are assigned using other storage unit sizes, such as the 512 byte storage unit used by SCSI, each 64 kilobyte segment includes 128 SCSI storage units, and the starting logical address in each segment may be determined by multiplying the segment number by 128.

When a large amount of data is being written to the RAID array 200, the P and Q values for each row/stripe may be computed as each segment in the row/stripe is written, with the P and Q values being written as the last two segments in the row/stripe. When only single segments are being written to the RAID array 200, such as during an update to and/or replacement of a segment, the segment is read followed by the P and Q segments from the same row/stripe. The data read from the segment is then removed from the parity values of P and Q and then the new data for the segment is added to the parity values of P and Q. The segment is then overwritten with the new data and the new P and Q parity values are written over the old P and Q parity values in the corresponding segments.

Without modification, RAID arrays, such as the RAID array 200 are generally not ideal for big data storage, such as that used by HDFS. This is due to the use of striping by the RAID array and the general desire to consecutively access multiple large multi-segment data blocks during operations like map-reduce. Consider the scenario where a RAID array uses 64 kilobyte segments and the large multi-segment blocks used by HDFS include 64 megabytes of user data and 512 kilobytes of metadata. Each multi-segment HDFS block stored in the RAID array uses 1032 segments (1024 for the user data and 8 for the metadata). When this multi-segment HDFS block is stored in the RAID array 200 it occupies 129 stripes. When the RAID array is asked to retrieve a single multi-segment block it may do so efficiently by moving in order from stripe to stripe. However, as soon as the RAID array is asked to concurrently retrieve two or more large multi-segment blocks, it may end up alternating accesses to segments that are at least 129 stripes apart. When the storage devices in the RAID array are disk drives, this may result in a significant drop in efficiency as the disk drives end up thrashing back and forth between the very distant stripes with the corresponding long seek delays with each thrash between stripes from the different large multi-segment blocks.

This thrashing may be significantly reduced and/or eliminated by more intelligently controlling the segments to which each large multi-segment block is written to. If segments from multiple large multi-segment blocks are carefully interleaved in the RAID array, it is possible to store each of the large multi-segment blocks so that it is stored on a single one of the storage devices in the RAID array. This, in effect, transposes the storage of individual large multi-segment blocks so that instead of being stored across the columns/storage devices in rows/stripes, the large multi-segment block is stored in a single column/storage device. By transposing the storage for large multi-segment blocks in a RAID array, the RAID array becomes an effective substitute for the distributed storage devices and replication of blocks typically used with HDFS. Thus, the application using the Hadoop framework and/or Hadoop API may use RAID-based storage devices with their lower storage overhead without suffering from reduced performance caused by thrashing when a RAID array with un-transposed storage is asked to concurrently retrieve data from two or more large multi-segment HDFS blocks.

For example, when the RAID array includes D storage devices, by waiting until D multi-segment blocks are ready to be written, it is possible to store each of the D multi-segment blocks on its own storage device in the RAID array by controlling the order in which segments from the D multi-segment blocks are sent to the RAID array for writing. This approach allows the RAID array to lay down the segments in the stripes in the normal allocation order, consistent with a burst-style write operation, but helps ensure that each multi-segment block is written to a single storage device. In the examples of FIG. 2, this may be accomplished by selecting segments from ten large blocks based on the order in which the logical addresses are assigned to the various columns/storage devices. Thus, segments may be selected in order from the first through eighth large blocks for the first stripe with the RAID array preparing and writing the P and Q segments on the ninth and tenth storage devices based on the other segments on the first stripe. The ninth large block is skipped and then a segment from the tenth large block is followed by segments from the first through seventh large blocks for the second stripe with the RAID array again preparing and writing the P and Q segments on the eighth and ninth storage devices. For the third stripe, segments are selected from the ninth and tenth large blocks and then the first through sixth large blocks with the RAID array handling the P and Q segments on the seventh and eighth storage devices. This pattern continues until after every tenth stripe the pattern repeats. This approach may also be adapted to write fewer than D large blocks by skipping over some of the segments during the writing process by providing either dummy segments or using partial writes that also update the P and Q segments on the respective stripes. The storage system then records at least the starting or base logical address and/or the row and column of the first segment in the large block in a data structure so that the large block may be located later during subsequent storage operations.

Reading back the multi-segment blocks from the RAID array presents more of a challenge because each of the multi-segment blocks is no longer stored at consecutive logical addresses. When a multi-segment block is read from the RAID array, a corresponding logical address for that segment in the RAID array is determined for each of the segments in the multi-segment block. This translation from a segment number to a logical address involves determining the starting or base logical address for the multi-segment block in the RAID array and then stepping through each of the logical addresses based on the segment number or offset within the multi-segment block. The starting or base logical address may be determined by consulting the data structure maintained during write operations that associates multi-segment blocks with starting or base logical addresses and/or a starting row and column in the RAID array.

Thrashing in the RAID array may be reduced by exercising additional controls on how the multi-segment blocks are read. When multiple multi-segment blocks are being concurrently read from the RAID array, thrashing is greatly reduced as long as each of the multi-segment blocks is stored in a different storage device. This is because the RAID array may operate the seek operations on each of the storage devices independent of the others. To further reduce thrashing, the storage system may control the ordering of read operations so when two requested multi-segment blocks are stored in the same storage device, all of the read requests for one of the multi-segment blocks should be handled before any read requests for the other of the multi-segment blocks. This may be accomplished by using individual first-in first-out (FIFO) queues for each of the storage devices in the RAID array.

Figure 3:
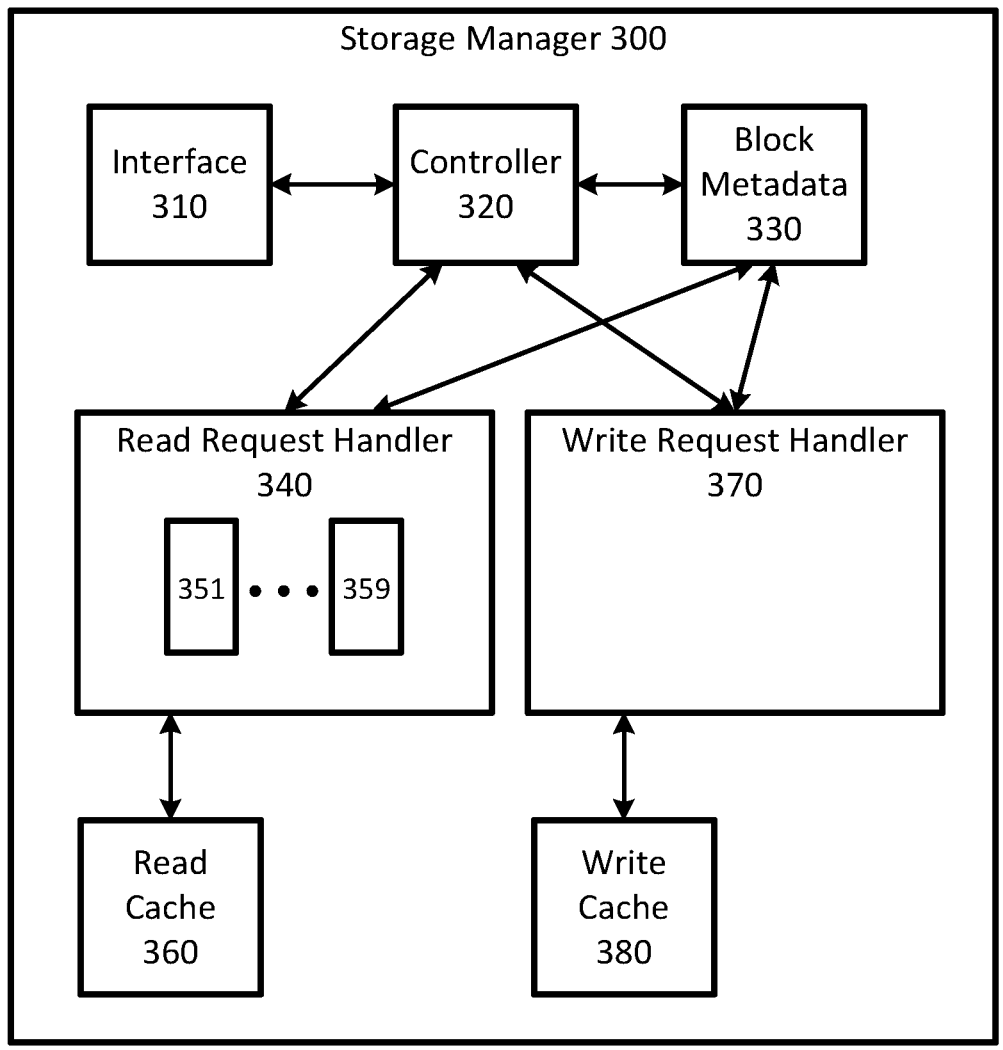
FIG. 3 is a simplified diagram of an example storage manager according to some embodiments.

FIG. 3 is a simplified diagram of an example storage manager 300 according to some embodiments. In some embodiments, storage manager 300 may be storage manager 140. As shown in FIG. 3, storage manager 300 includes an interface 310 from which it may receive storage requests from applications such as application 170 and/or map-reduce interfaces. As each storage request is received it is typically passed to a controller 320 where it is examined and further processed. The storage requests may be received at interface 310 via API calls, remote procedure calls, web services requests, as part of one or more messages, and/or similar mechanisms. The storage requests may each include a block identifier that may be used to determine the block or multi-segment block that is to be accessed to satisfy the respective storage request.

Controller 320 provides the general control and/or management for storage manager 300. As controller 320 processes storage requests, it may access a block metadata data structure 330 that keeps track of where each of the blocks are stored in the RAID array, such as RAID array 160 and/or 200, being managed by storage manager 300. In some examples, the block metadata data structure 330 may include a record for each block being managed. Each record includes sufficient information that allows storage manager 300 to determine the logical addresses associated with each block identifier provided in a storage request. For example, the record may include a starting or base logical address for the corresponding block and/or a row and column location of the first segment of the block in the RAID array. In some examples, the records may be indexed by the block identifiers. Any suitable collection-based data structure may be used for block metadata data structure 330, such as arrays, vectors, maps, database tables, and/or the like.

Controller 320 further examines the received storage requests to determine whether they are block read or write requests. When the storage requests are block read requests, they are passed to a read request handler 340. The read request handler 340 uses the starting or base address information or the row and column information for the block in each block read request to determine the corresponding storage device on which the block is stored. Once the storage device is determined, the block read request is placed in the FIFO queue 351-359 for that storage device. When the block read request reaches the head of its respective FIFO queue 351-359, it is extracted from the respective FIFO queue 351-359. By using one FIFO queue 351-359 for each storage device, the read request handler 340 may wait for the segment read requests for a first block on a storage device to complete before sending segment read requests to the RAID array for a second block on the same storage device, thus reducing the possibility that the storage device will be asked to handle segment read requests for the second block at very different logical addresses in between segment read requests for the first block. The block read request is further examined by the read request handler 340 and the logical addresses of the segments storing the requested portions of the requested block are determined The logical addresses are then used to generate one or more segment read requests that are sent to the RAID array for further handling. The likelihood of thrashing may also be reduced by sending the segment read requests to the RAID array in order of ascending logical addresses.

When the RAID array returns the requested segments, they are passed back to controller 320 and then returned to the application that made the corresponding block read request. Read request handler 340 may further use read caching to improve its read operation. This may include checking a read cache 360 to see whether the requested block is cached before placing the block read request in one of the FIFO queues 351-359 and/or sending segment read requests to the FIFO array. When responses from the segment read requests are returned from the RAID array, the data in them may be cached in read cache 360. Read cache 360 may include one or more types of machine readable media suitable for use in a cache, including floppy disk, flexible disk, hard disk, any other magnetic medium, optical media, RAM, EEPROM, FLASH-EPROM, and/or any other rewritable memory chip, cartridge, or medium from which a processor or computer is adapted to read.

When the storage requests are block write requests, they are passed to a write request handler 370. The write request handler 370 uses a write cache 380 to collect write data associated with multiple blocks before sending the write data to the RAID array via a series of segment write requests, thus implementing a write back strategy. In some examples, write cache 380 may include at least enough storage capacity to cache as many blocks as there are storage devices in the RAID array. This allows write request handler 370 to write segments to consecutive logical addresses of the RAID array by interleaving segments from the cached blocks as described previously. As each of the blocks are written to the RAID array, the block metadata data structure 330 is updated to associate the starting or base logical address and/or the row and column of the starting segment with the corresponding block identifier. This update allows the read request handler 340 to appropriately handle requests for the blocks later. Write cache 380 may include one or more types of machine readable media suitable for use in a cache, including floppy disk, flexible disk, hard disk, any other magnetic medium, optical media, RAM, EEPROM, FLASH-EPROM, and/or any other rewritable memory chip, cartridge, or medium from which a processor or computer is adapted to read.

In some embodiments, the write request handler 370 may not be able to wait until a sufficient number of blocks are cached in write cache 380 before sending segment write requests to the RAID array. In some examples, this may occur when segment write requests are being processed that update a portion of a previously written block and/or to overwrite and reclaim a deleted block. In some examples, this may also occur when a caching policy for write cache 380 includes a maximum delay between when the block is written to storage manager 300 and when the block is stored in the RAID array. In some examples, write request handler 370 may use one or more timers to implement these delays. In some examples, this may additionally occur as part of the write back operation that occurs when a block or page in write cache 380 is invalidated prior to replacement.

In some embodiments, read request handler 340 may additionally consult write cache 380 to determine whether a requested block is located in write cache 380, such as when a block is written to storage manager 300, but is not yet written to the RAID array.

FIG. 4 is a simplified diagram of example algorithms used to determine logical addresses of segments according to some embodiments. Algorithms 410-440 may be used by storage manager 140 and/or 300 to determine the logical addresses used for the segments of blocks being stored and managed by storage manager 140 and/or 300. Algorithms 410-440 describe examples of ways to convert the starting or base logical address of a block and a segment offset within a block into the logical address where the corresponding segment is stored in a RAID array. Other algorithms equivalent to algorithms 410-440 may be used to achieve the same computations. Algorithms 410-440 are representative of the computations used when the RAID array is consistent with a RAID 6 implementation similar to the one shown in FIG. 2. For different RAID versions, algorithms 410-440 may be updated to reflect differences in the pattern of logical address assignments to the segments in those different RAID versions. Algorithms 410-440 use D to represent the number of drives or storage devices used by the RAID array. Each of the algorithms 410-440 also assume that blocks are stored beginning at a "nice" logical address which corresponds to the beginning of a segment on one of the storage devices in the RAID array. As with the segment numbering of FIG. 2, the logical address computations in algorithms 410-440 may be scaled to reflect different granularities in the assignment of logical addresses.

Algorithm 410 describes one possible way to iteratively determine the logical addresses of the segments in a block within the RAID array beginning with a Base logical address. Each of the logical addresses is recorded into the array Addr, where the index of array Addr corresponds to the segment offset within the block. For example, the first segment of the block has an offset of zero, the second segment of the block has an offset of 1, and so on. Size indicates the number of segments in the block and corresponds to the size of the block Algorithm 410 begins by noting that the logical address of the first segment is stored at the Base logical address. A variable Next in then used to track how the logical addresses increase with each segment of the block. Algorithm 410 then iterates through each of the remaining segments of the block. As the logical addresses of each of the segments is determined in turn, algorithm 410 determines whether the next segment is located on the next row/stripe of the RAID array or whether two rows/stripes are skipped to account for P and Q parity segments. The test for whether the next segment is one or three stripes away is determined by testing when the remainder found when the logical address is divided by (D−2) is (D−3). In the examples of FIG. 2, this corresponds to whenever the logical address divided by 8=10−2 is equal to 7=10−3. This corresponds to the logical addresses 7, 15, . . . , 63, 71, 79, . . . . From FIG. 2 these logical addresses correspond to each segment located in the same column/storage device but in the row/stripe before a P segment in that column/storage device. When one of these logical addresses is encountered, the logical address or the next segment is located three stripes away at a logical address that is 2*D−3 (17=2*10−3 in FIG. 2) larger. In the other cases the next segment is located in the next row/stripe at a logical address that is D−1 (9=10−1 in FIG. 2) larger. Once the logical address of the next segment is determined, it is recorded in the Addr array. The storage manager may then use the Addr array to determine the logical address of any segment within the block based on the offset of the segment within the block.

Algorithm 420 shows one possible way to determine the logical address of any segment based on the Base address of the block and the Offset of the segment within the block without having to iterate through each of the segment logical addresses. In some examples, algorithm 420 may be more suitable for random access to a desired segment within a block.

Algorithm 420 begins by determining how may full rotations of P and Q stripe patterns and the number of steps within the last rotation exist between the Base logical address and the logical address of the segment with the Offset. Each full rotation of P and Q includes D−2 (8=10−2 in FIG. 2) segments, so the number of full rotations and the number of steps may be determined using the integer division and modular (remainder) functions using the Offset. The Addr of the segment may then be advanced D*(D−2) (80=10*(10−2 in FIG. 2) logical addresses for each full rotation.

Once the full rotations are accounted for, algorithm 420 accounts for whether stripes with P and Q segments are included in the last rotation. This may be determined by observing how far into the rotation the Base address occurs by finding the remainder when the Base address is divided by (D−2) (8=10−2 in FIG. 2) and then adding in the number of steps the logical address of the Offset is within the last rotation. This combination crosses the P and Q stripes when the sum is greater than or equal to (D−2) (8=10−2 in FIG. 2). When the P and Q stripes are skipped this accounts for 2*D−3 (17=2*10−3 in FIG. 2) logical addresses plus (D−1) (9=10−1 in FIG. 2) logical addresses for each of the remaining steps in the last rotation. When the P and Q stripes are not skipped, (D−1) (9=10−1 in FIG. 2) logical addresses are skipped for each step in the last rotation.

Algorithm 430 shows one possible way to determine the Row and column/storage device (Col), of the Base address for a block, or any other logical address in a RAID array. Because each row/stripe in the RAID array includes D−2 (8=10−2 in FIG. 2) segments, the Row may be determined by the number of full rows in the RAID array before the Base address by finding the integer quotient when the Base address is divided by (D−2). The Partial position of the Base address within the row/stripe may be determined by finding the remainder when the Base address is divided by (D−2). However, because logical address assignment on each row/stripe begins to the right of the Q segment (with the exception of the rows/stripes that are evenly divisible by D), the logical addresses of the Partial segments are assigned beginning with the starting column/storage device (StartCol) found by subtracting D from the remainder when the Row is divided by D. When the Row reaches the end (i.e., where the column/storage device reaches D), the logical addresses roll over to zero, which may be accounted for by finding the remainder when the sum of the starting column/storage device and the number of Partial segments is divided by D.

Algorithm 440 shows one possible way to determine a logical address for a segment, such as the Base segment of a block, from the row/stripe (Row) and the column/storage device (Col) in which the segment is stored. Determination of the logical address depends on whether the segment is to the right or the left of the P and Q segments on the same row/stripe. This may be determined by comparing the column/storage device for the segment to the remainder when the row/stripe is divided by D. Looking at each row/stripe from left to right shows that the logical address in the first (zero) column is evenly divisible by (D−1) (9=10−1 in FIG. 2) and has the value Row*(D−1). When the segment is to the left of the P and Q segments, the logical addresses of the segment is larger than the logical address of the segment in the first column by the column/storage device number. When the segment is to the right of the P and Q segments, the logical addresses of the segment is smaller than the logical address of the segment in the first column by the column/storage device subtracted from D.

Figure 5:
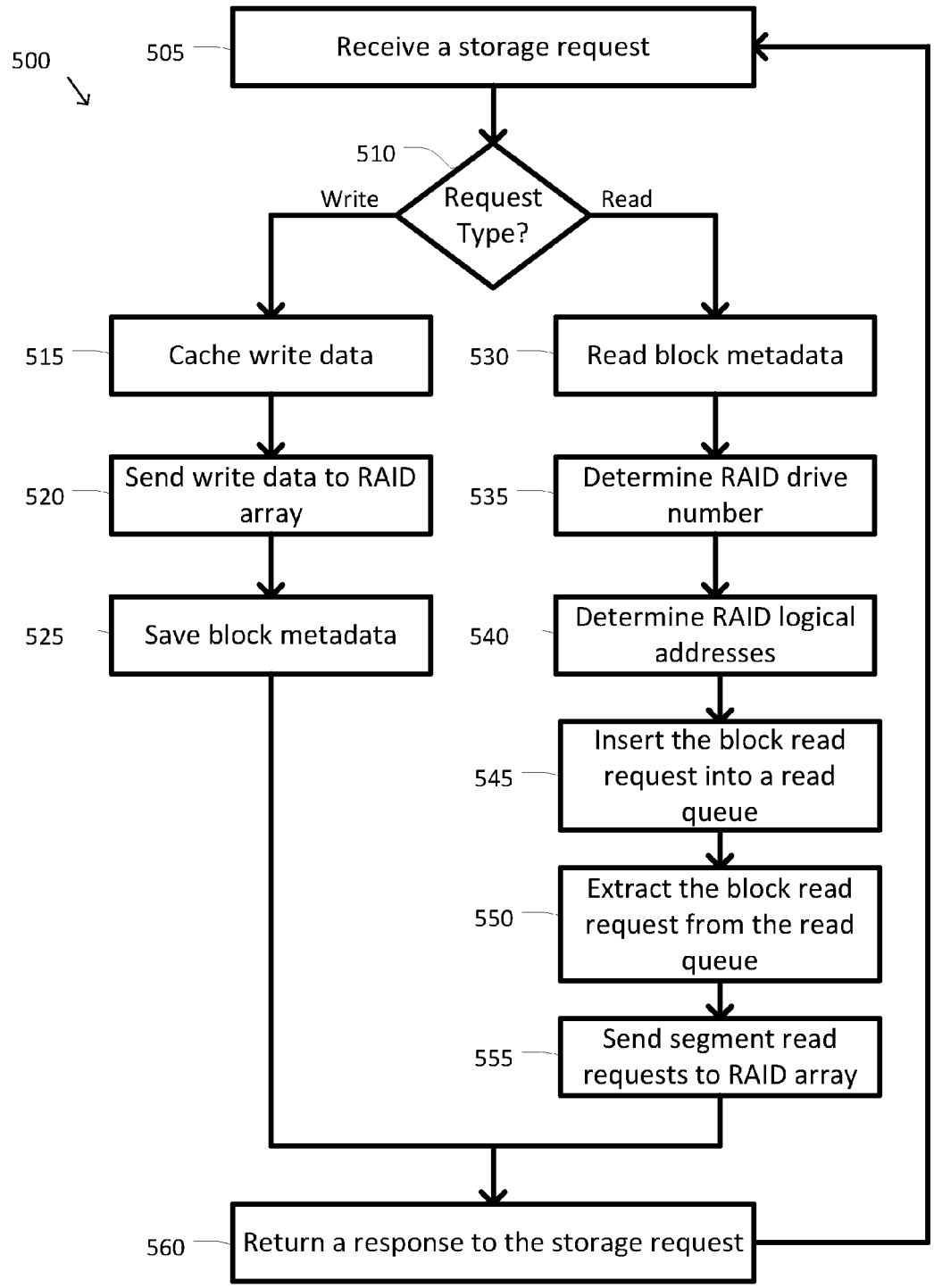
FIG. 5 is a simplified diagram of an example method of storage request handling according to some embodiments.

FIG. 5 is a simplified diagram of an example method 500 of storage request handling according to some embodiments. One or more of the processes 505-560 of method 500 may be implemented, at least in part, in the form of executable code stored on non-transitory, tangible, machine readable media that when run by one or more processors (e.g., processor 120 in storage server 110) may cause the one or more processors to perform one or more of the processes 505-560. For example, method 500 may be implemented by storage manager 140 and/or 300 on behalf of storage server 110.

At a process 505, a storage request is received. As each application, such as application 170, desires to read and write data to a storage system, they make requests to the storage system. In some embodiments, these requests may be received by a storage manager, such as storage manager 140 and/or 300. The storage requests may be received at an interface of the storage manager, such as interface 310, via API calls, remote procedure calls, web services requests, as part of one or more messages, and/or similar mechanisms. The storage requests may each include a block identifier that may be used to determine the block or multi-segment block that is to be accessed to satisfy the respective storage request.

At a process 510, it is determined whether the storage request is a block read request or a block write request. The storage request received during process 505 is examined to determine whether it is a block read request or a block write request. In some examples, the storage request may include one or more fields that designate the storage request as a block read request or a block write request. In some examples, different API calls, remote procedure calls, web services, and/or the like may be used for block read requests and block write requests. When the storage request is a block write request, it is handled beginning with a process 515. When the storage request is a block read request, it is handled beginning with a process 530.

At the process 515, write data is cached. When the storage request is a block write request, the block write request may include data that is to be written to a storage system. Rather than send the write data directly to the storage devices used by the storage system, the write data is temporarily stored in a write cache. The use of a write cache allows the storage server to accumulate write data for at least as many different blocks as there are storage devices in the RAID array that is used as storage for the storage system. The use of a write cache may also make the storage system more responsive to block write requests as the write data may typically be cached more quickly than it can be written to the storage devices in the RAID array.

At a process 520, the write data is sent to the RAID array. The storage manager for the storage system periodically sends the write data in the write cache to the RAID array for storage in the storage devices of the RAID array. In some examples, the storage devices may be the storage devices 164 in RAID array 160. The write data may be sent to the RAID array by making one or more segment write requests to a RAID controller for the RAID array. The storage manager may decide to send the write data to the RAID array based on one or more policies. In some examples, one of the policies may include writing the write data to the RAID array when write data has been received for as many blocks as there are storage devices in the RAID array. The storage manager may send segment write requests with segments interleaved from each of the blocks in the write cache so that the segment write requests sent to the RAID array occur in an order so that each of the blocks is written to in a single respective storage device. In some examples, the order in which the segments are selected from the blocks is consistent with the logical address numbering of FIG. 2.

In some embodiments, other policies may include writing the write data to the RAID array before write data from a complete set of blocks is stored in the write cache. In some examples, the write data may be sent to the RAID array when the block write request is updating a previously written block, a maximum delay has passed since the write data was received by the storage manager, and/or when write back occurs during write cache page invalidation and/or page replacement. In some embodiments, when the storage manager sends less than a complete set of blocks, the segment write requests sent to the RAID array may include the logical addresses to be used for the write data. In some examples, when less than a complete set of blocks is being sent to the RAID array, the address calculations of algorithms like algorithms 410 and/or 420 may be used to specify the logical address of each of the segments of write data being written to the RAID array. In some examples, when the set of blocks are new blocks, the storage manager may send dummy segments to the RAID array for the missing blocks so that RAID array may assign the logical addresses to the segments in consecutive order.

Each of the segment write requests sent to the RAID controller of the RAID array may generate a response from the RAID controller indicating the logical addresses or the rows/stripes and columns/storage devices of the segments into which the write data is being written to.

At a process 525, block metadata is saved. After the write data for each block is sent to the RAID array, metadata associated with the block is saved in a block metadata data structure, such as block metadata data structure 330. The storage manager may use the logical addresses returned in response to the segment write requests of process 520, to determine where each of the blocks is being written in the RAID array. In some examples, the logical address of the first segment of the first segment in each block may be recorded as a starting or base logical address for the block in the corresponding record of the block metadata data structure. In some examples, the row and column location of each block may be recorded in the corresponding record of the block metadata data structure. The storage manager may use algorithms like algorithms 430 and/or 440 to convert between starting or base logical address values and row/stripe and column/storage device values based on the information returned during process 520 and the metadata to be recorded in the block metadata data structure.

Responses from the handling of the block write request received during process 505 may be returned using a process 560. For example, the response may be returned as soon as the write data is cached during process 515.

At the process 530, block metadata is read. Using a block identifier in the block read request received during process 505, the storage manager may read or retrieve a record from the block metadata data structure corresponding to the block identifier using a lookup and/or search operation. For example, the block metadata data structure may be indexed by block identifiers to facilitate this lookup and/or search operation.

At a process 535, the RAID drive number is determined When the block metadata data structure records include the column/storage device for the first segment of the block, the RAID drive number may be determined from this value. When the block metadata data structure records include the starting or base logical address for the block, an algorithm like algorithm 440 may be used to determine the RAID drive number.

At a process 535, the RAID logical addresses are determined Because the segments in the block are not stored in consecutive logical addresses in the RAID array, the offsets of the desired segments from the block that is being read are converted to the logical addresses where they are stored in the RAID array. Algorithms like algorithms 410 and/or 420 may be used to convert the segment offsets to their corresponding logical addresses.

At a process 545, the block read request is inserted into a read queue. To help prevent thrashing that may be caused by sending segment read requests for two or more blocks that are stored on the same storage device in the RAID array, the block read requests are inserted into the read queue that corresponds to the RAID drive number determined during process 535. Use of separate read queues for each of the storage devices helps reduce the likelihood that none of the storage devices will receive segment read requests for a first block in between segment read requests for a second block with the large change in logical addresses that likely exists between the first and second blocks. In some examples, the read queue may be one of the FIFO queues 351-359.

At a process 550, the block read request is extracted from the read queue. When the block read request reaches the head of the read queue it is extracted from the read queue for further processing.

At a process 560, segment read requests are sent to the RAID array. Using the RAID logical addresses determined during process 535, one or more segment read requests are sent to the RAID array. In some examples, each of the segment read requests includes a corresponding logical address for one of the segments from the block. To help prevent thrashing, the segment read requests may be sent to the RAID array in order of ascending logical address so that as the corresponding storage device of the RAID array responds to the segment read requests, it seeks in a consistent direction. Thrashing may further be prevented by ensuring that the segment read requests for the block are not sent to the RAID array until each of the segment read requests for the previous block (i.e., the segment read requests corresponding to the previous block read request extracted from the read queue) are handled by the RAID array.

In some embodiments, the data returned by the RAID array as responses from the segment read requests may be stored in a read cache, such as read cache 360. The data may also be returned as responses to the read request received during process 505 by using process 560.

At the process 560, a response to the storage request is returned. Based on the responses received for the segment write requests send to the RAID array during process 520 and/or the segment read requests sent to the RAID array during process 555, a response to the storage request received during process 505 is returned to the application that made the storage request. In some examples, when the storage request was received due to an API call, the response may be returned as a return value for the API call. In some examples, the response may be returned using one or more messages. Method 500 may then repeat with the receipt of another storage request during process 505.

The scope of embodiments for storage request handling in a storage system is not limited to the structures and arrangements shown in FIG. 5. According to some embodiments, the storage manager performing method 500 may also include further support for caching. In some examples, the storage manager may determine whether segments associated with a block are stored in the write cache or the read cache before performing much of the processing of processes 530-555. According to some embodiments, the storage manager may further provide support for load balancing, filling of deleted blocks, and/or other storage system operations. In some examples, this may include moving blocks from one storage device to another storage device within the RAID array to better balance the utilization among the storage devices. As the blocks are redistributed, the records for the corresponding blocks in the block metadata data structure are updated to reflect the change in block location.

Some examples of storage server 110, storage manager 140, and/or storage manager 300 may include non-transient, tangible, machine readable media that include executable code that when run by one or more processors may cause the one or more processors (e.g., the processor 120 in storage server 110) to perform the processes of method 500 and/or algorithms 410-440 as described above. Some common forms of machine readable media that may include the processes of method 500 and/or algorithms 410-440 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computing device comprising:
   a memory containing machine readable medium comprising machine executable code having stored thereon instructions for performing a method of storage management;
   a processor coupled to the memory, the processor configured to execute the machine executable code to cause the processor to:
   receive a write request for a first multi-segment block, the first multi-segment block being a group of segments assigned to consecutive logical segment addresses by a file system; and
   send, to a storage array comprising a plurality of storage devices for which consecutively allocated segments within the storage array are assigned to different ones of the storage devices by the storage array, segment write requests for the first multi-segment block interleaved with segment write requests for other multi-segment blocks so that all segments for the first multi-segment block are written to a first storage device of the storage devices in the storage array.

2. The computing device of claim 1, wherein all segments of each one of the other multi-segment blocks are written to a same respective one of the storage devices in the storage array, the same respective one of the storage devices in the storage array being different for each of the other multi-segment blocks.

3. The computing device of claim 1, further comprising:
   a write cache capable of storing data for at least N multi-segment blocks, N being a number of the storage devices in the storage array;
   wherein the processor is further caused to store data from the first multi-segment block and each of the other multi-segment blocks in the write cache before sending the interleaved segment write requests to the storage array.

4. The computing device of claim 1, wherein the processor is further caused to:
   receive a read request for a second multi-segment block, the read request identifying the second multi-segment block and one or more segments in the second multi-segment block;
   determine logical addresses of each of the one or more segments in the second multi-segment block; and
   send one or more segment read requests to the storage array, the segment read requests including the logical addresses.

5. The computing device of claim 4, wherein the processor is further caused to send the segment read requests to the storage array in an order based on values of the logical addresses.

6. The computing device of claim 4, wherein the processor is further caused to:
   determine a second storage device from the storage devices, the second storage device storing the second multi-segment block; and
   delay the sending of the one or more segment read requests to the storage array until the storage array handles any previous segment read requests sent to the storage array for other multi-segment blocks stored on the second storage device.

7. The computing device of claim 4, further comprising:
   N read queues, N being a number of the storage devices in the storage array and each of the N read queues being associated with a corresponding one of the storage devices;
   wherein the processor is further caused to insert the read request into one of the N read queues based on a storage device in the storage array on which the one or more segments in the second multi-segment block are stored.

8. A method comprising:
   receiving, by a storage server, a write request for a first multi-segment block, the first multi-segment block comprising a group of segments assigned to consecutive logical segment addresses by a file system; and sending, by the storage server to a storage array comprising a plurality of storage devices for which consecutively allocated segments within the storage array are assigned to different ones of the storage devices by the storage array, segment write requests for the first multi-segment block interleaved with segment write requests for other multi-segment blocks so that all segments for the first multi-segment block are written to a first storage device of the storage devices in the storage array.

9. The method of claim 8, wherein all segments of each one of the other multi-segment blocks are written to a same respective one of the storage devices in the storage array, the same respective one of the storage devices in the storage array being different for each of the other multi-segment blocks.

10. The method of claim 8, further comprising storing, by the storage server, data from the first multi-segment block and each of the other multi-segment blocks in a write cache before sending the interleaved segment write requests to the storage array, the write cache being capable of storing data for at least N multi-segment blocks, N being a number of the storage devices in the storage array.

11. The method of claim 8, further comprising:
receiving, by the storage server, a read request for a second multi-segment block, the read request identifying the second multi-segment block and one or more segments in the second multi-segment block;
determining, by the storage server, logical addresses of each of the one or more segments in the second multi-segment block; and
sending, by the storage server, one or more segment read requests to the storage array, the segment read requests including the logical addresses.

12. The method of claim 11, further comprising sending, by the storage server, the segment read requests to the storage array in an order based on values of the logical addresses.

13. The method of claim 11, further comprising:
determining, by the storage server, a second storage device from the storage devices, the second storage device storing the second multi-segment block; and
delaying, by the storage server, the sending of the one or more segment read requests to the storage array until the storage array handles any previous segment read requests sent to the storage array for other multi-segment blocks stored on the second storage device.

14. The method of claim 11, further comprising inserting, by the storage server, the read request into one of N read queues based on a storage device in the storage array on which the one or more segments in the second multi-segment block are stored, N being a number of the storage devices in the storage array and each of the N read queues being associated with a corresponding one of the storage devices.

15. A non-transitory machine readable medium having stored thereon instructions for performing a method comprising machine executable code which when executed by at least one machine, causes the machine to:
receive a write request for a first data block, the first data block comprising a plurality of segments assigned to consecutive logical block addresses by a file system; and
send, to a RAID array comprising a plurality of storage devices for which consecutively allocated segments within the RAID array are assigned to different ones of the storage devices by the RAID array, segment write requests for the first data block interleaved with segment write requests for other data blocks so that all segments for the first data block are written to a first storage device of the storage devices in the RAID array.

16. The non-transitory machine readable medium of claim 15, wherein all segments of each one of the other data blocks are written to a same respective one of the storage devices in the RAID array, the same respective one of the storage devices in the RAID array being different for each of the other data blocks.

17. The non-transitory machine readable medium of claim 15, wherein execution of the machine executable code further causes the machine to:
store data from the first data block and each of the other data blocks in a write cache before sending the interleaved segment write requests to the RAID array, the write cache being capable of storing data for at least N data blocks, N being a number of the storage devices in the RAID array.

18. The non-transitory machine readable medium of claim 15, wherein execution of the machine executable code further causes the machine to:
receive a read request for a second data block, the read request identifying the second data block and one or more segments in the second data block;
determine logical block addresses of each of the one or more segments in the second data block; and
send one or more segment read requests to the RAID array, the segment read requests including the logical block addresses.

19. The non-transitory machine readable medium of claim 18, wherein execution of the machine executable code further causes the machine to:
determine a second storage device from the storage devices, the second storage device storing the second data block; and
delay the sending of the one or more segment read requests to the RAID array until the RAID array handles any previous segment read requests sent to the RAID array for other data blocks stored on the second storage device.

20. The non-transitory machine readable medium of claim 18, execution of the machine executable code further causes the machine to store the read request into one of N read queues based on a storage device in the RAID array on which the one or more segments in the second data block are stored, N being a number of the storage devices in the RAID array and each of the N read queues being associated with a corresponding one of the storage devices.

* * * * *